United States Patent
Marohl et al.

(10) Patent No.: US 12,103,468 B1
(45) Date of Patent: Oct. 1, 2024

(54) RECESSED BADGE ASSEMBLY FOR CUSHIONED SURFACES AND RELATED METHODS

(71) Applicant: Correct Craft IP Holdings, LLC, Orlando, FL (US)

(72) Inventors: Aaron M. Marohl, Saint Cloud, FL (US); Eric J. Miller, Orlando, FL (US); Adam C. Greer, Orlando, FL (US); Matthew G. Moore, Oviedo, FL (US); Stephen A. Carlton, Saint Cloud, FL (US); Justin W. Love, Orlando, FL (US)

(73) Assignee: CORRECT CRAFT IP HOLDINGS, LLC, Orlando, FL (US)

( * ) Notice: Subject to any disclaimer, the term of this patent is extended or adjusted under 35 U.S.C. 154(b) by 194 days.

(21) Appl. No.: 17/738,147

(22) Filed: May 6, 2022

Related U.S. Application Data

(60) Provisional application No. 63/186,224, filed on May 10, 2021.

(51) Int. Cl.
*A47C 31/02* (2006.01)
*B60N 2/64* (2006.01)
*B60R 13/00* (2006.01)

(52) U.S. Cl.
CPC .............. *B60R 13/005* (2013.01); *B60N 2/64* (2013.01)

(58) Field of Classification Search
CPC ... A44B 1/12; Y10T 24/3645; Y10T 24/3681; Y10T 24/3689; A47C 31/026
See application file for complete search history.

(56) References Cited

U.S. PATENT DOCUMENTS

| | | | | |
|---|---|---|---|---|
| 902,407 A | * | 10/1908 | Humphrey | A47C 31/026 24/350 |
| 1,881,962 A | | 10/1932 | Perlman et al. | |
| 1,995,857 A | * | 3/1935 | Manson | A47C 31/026 24/106 |
| 2,103,955 A | * | 12/1937 | Place | A47C 31/026 411/514 |
| 2,433,986 A | | 1/1948 | Forbes | |
| 2,939,191 A | | 6/1960 | Emsig | |
| 3,449,802 A | * | 6/1969 | Walter | A44B 1/28 411/353 |

(Continued)

FOREIGN PATENT DOCUMENTS

CN 211809220 10/2020

*Primary Examiner* — Shin H Kim
(74) *Attorney, Agent, or Firm* — Allen, Dyer, Doppelt + Gilchrist, PA

(57) ABSTRACT

A badge assembly comprises a badge, a cushion and a cable. The badge has a front surface and a rear surface, a cable mounting point located on the rear surface and at least one alignment prong extending from the rear surface. The cushion includes padding and a substrate, a cable routing hole extending through at least the padding, the badge being seated in the padding over cable routing hole and the at least one alignment prong extending into the padding adjacent the cable routing hole. The cable extends through the cable routing hole and has a first end connected the cable mounting hoop in the cable mounting hole and a second end fastened to the substrate, a tension of the cable holding the badge at a recessed depth within the padding. The cable has a predetermined length to set the desired depth.

15 Claims, 1 Drawing Sheet

(56) References Cited

U.S. PATENT DOCUMENTS

| | | | | |
|---|---|---|---|---|
| 3,591,876 | A * | 7/1971 | Swindlehurst | A47C 31/026 297/452.52 |
| 3,608,157 | A * | 9/1971 | Molt | B68G 7/08 223/102 |
| 3,701,174 | A * | 10/1972 | Randolph | B68G 7/08 5/655.6 |
| 3,807,800 | A * | 4/1974 | Morrison | A47C 31/026 297/452.56 |
| 3,856,353 | A * | 12/1974 | Morrison | A47C 31/026 297/452.56 |
| 3,938,224 | A * | 2/1976 | Delahousse | A47C 21/026 24/102 T |
| 4,037,296 | A * | 7/1977 | White | B68G 7/08 5/655.6 |
| 4,691,416 | A * | 9/1987 | Nakayama | A47C 31/026 24/601.2 |
| 5,214,811 | A * | 6/1993 | Priem | B68G 7/08 5/655.6 |
| 5,309,612 | A * | 5/1994 | Briere | B68G 7/08 24/114.3 |
| 5,704,082 | A * | 1/1998 | Smith | A47G 9/0292 24/72.5 |
| D535,872 | S * | 1/2007 | Smith | D8/389 |
| 7,240,382 | B2 * | 7/2007 | Berrocal | A47C 31/026 5/408 |
| 11,745,689 | B1 * | 9/2023 | Kutchey | B60R 21/21656 280/728.3 |
| 2005/0076447 | A1 * | 4/2005 | Berrocal | A47C 31/026 5/690 |
| 2008/0060136 | A1 * | 3/2008 | Smith | A47G 9/0292 5/658 |
| 2008/0289113 | A1 * | 11/2008 | Berrocal | B68G 7/08 5/658 |
| 2009/0098316 | A1 * | 4/2009 | Cox | A47C 31/026 428/28 |
| 2016/0345747 | A1 * | 12/2016 | Selle | A47C 31/026 |
| 2023/0041113 | A1 * | 2/2023 | Bengtsson | A47C 31/026 |
| 2023/0339420 | A1 * | 10/2023 | Kutchey | G09F 21/049 |
| 2023/0391278 | A1 * | 12/2023 | Kutchey | B60R 21/215 |

* cited by examiner

RECESSED BADGE ASSEMBLY FOR CUSHIONED SURFACES AND RELATED METHODS

CROSS-REFERENCE TO RELATED APPLICATION

This application claims the benefit of U.S. Provisional Patent Application Ser. No. 63/186,224, filed on May 10, 2021, the contents of which application are herein incorporated by reference in their entirety.

FIELD OF THE INVENTION

The present invention relates to the application of hard badges to vehicle seats and other cushioned surfaces, and more particularly to assemblies and methods for installing a recessed hard badge on such surfaces.

BACKGROUND OF THE INVENTION

Vehicle seats are often used to tastefully display the brand of the manufacturer. Embroidery is one popular means of doing this, although in certain environments—for example, where the vehicle seat is frequently exposed to sun and weather (like on a watercraft)—the embroidery thread can lack the durability and colorfastness to hold up over time. Hard badges offer an alternative that is still attractive but affords improved durability relative to embroidery. To avoid discomfort incident upon contact between the badge and a vehicle occupant, hard badges are often recessed into the cushion surface. However, achieving a uniform and easily repeatable recessed badge position can be difficult and/or require specialized mounting hardware installed within the cushion.

SUMMARY OF THE INVENTION

In view of the foregoing, it is an object of the present invention to provide an improved recessed badge assembly for cushioned surfaces and related methods. According to an embodiment of the present invention, a badge assembly comprises a badge, a cushion and a cable. The badge has a front surface and a rear surface, a cable mounting point located on the rear surface and at least one alignment prong extending from the rear surface. The cushion includes padding and a substrate, a cable routing hole extending through at least the padding, the badge being seated in the padding over cable routing hole and the at least one alignment prong extending into the padding adjacent the cable routing hole. The cable extends through the cable routing hole and has a first end connected the cable mounting hoop in the cable mounting hole and a second end fastened to the substrate, a tension of the cable holding the badge at a recessed depth within the padding.

According to an aspect of the present invention, the cushion further includes a cover over the padding, the cable routing hole also extending through the cover, at least one alignment opening being formed in the cover and the at least one alignment prong extending through at least one alignment opening into the padding.

According to a method aspect, the first end of the cable (which has a predetermined overall length) is attached to the cable mounting point on the rear surface of the badge. The cable is passed through the cable routing hole, which is pre-formed in the padding of the cushion. The second end of the cable is fastened to the substrate of the cushion at a predetermined attachment point such that the tension of the cable recesses the badge to the desired depth.

These and other objects, aspects and advantages of the present invention will be better appreciated in view of the drawings and following detailed description of preferred embodiments.

DETAILED DESCRIPTION OF PREFERRED EMBODIMENTS

Figure 1:
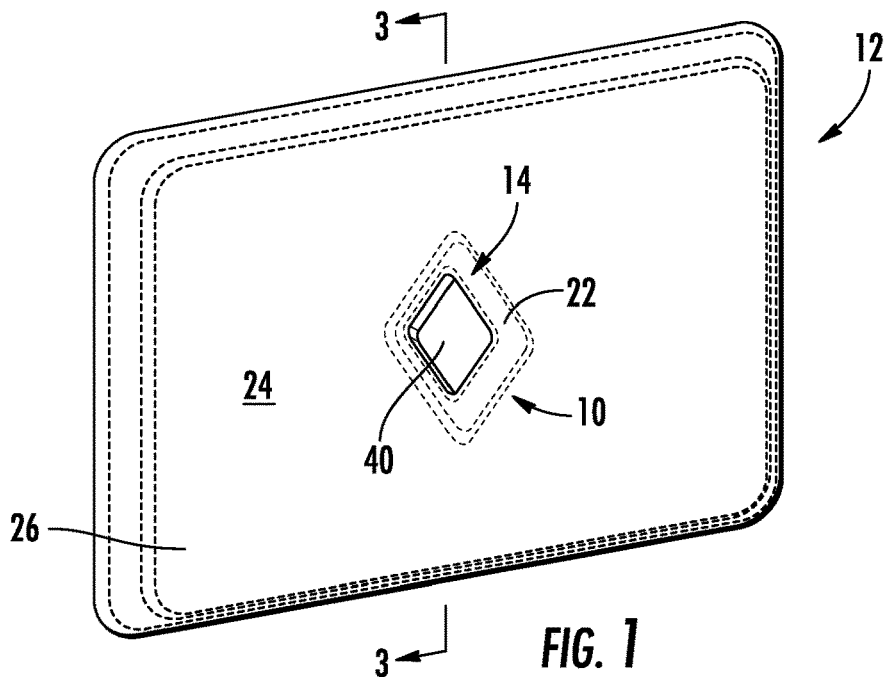
FIG. 1 is a front perspective view of a cushion including a recessed hard badge assembly, according to an embodiment of the present invention.
Figure 2:
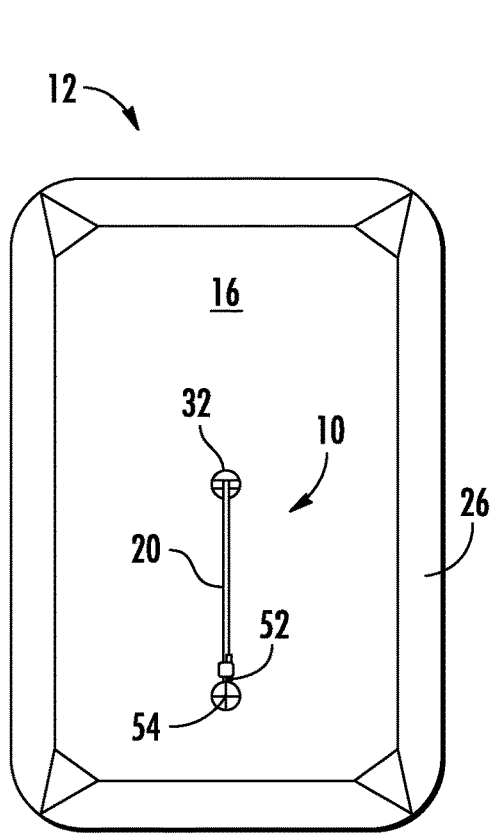
FIG. 2 is a rear view of the cushion and recessed hard badge assembly of FIG. 1.
Figure 3:
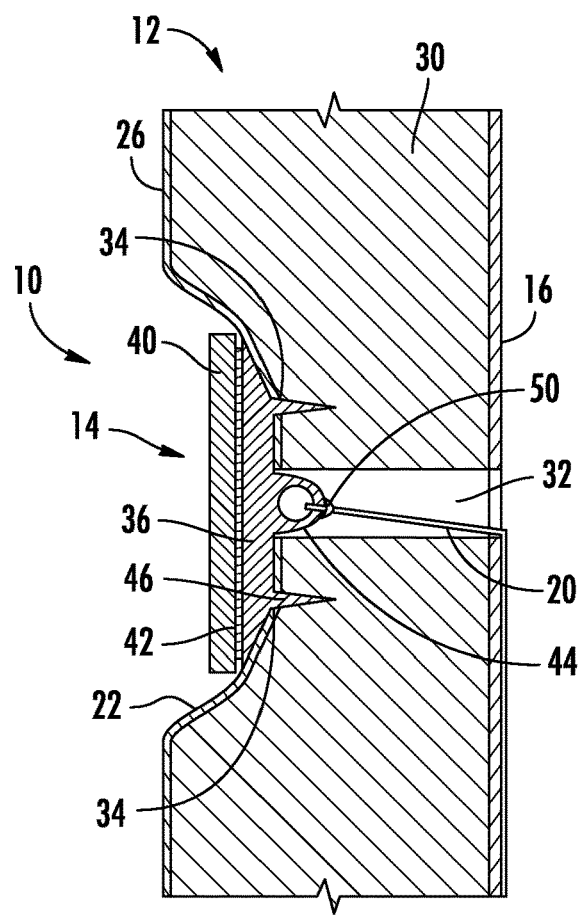
FIG. 3 is a sectional view taken along line 3-3 of FIG. 1.

According to an embodiment of the present invention, referred to FIGS. 1-3, a recessed hard badge assembly 10 is affixed to a cushion 12. The assembly 10 includes a badge 14 connected to a cushion substrate 16 via a cable 20 so as to create a recessed area 22 in an outer face 24 of the cushion 12.

The cushion 12 is generically represented and it will be appreciated that a recessed hard badge assembly according to the present invention, could be applied to any cushioned surface, such as vehicle seat cushions or other cushioned vehicle surfaces. In the depicted embodiment, the cushion 12 includes a cover 26 applied over padding 30, such as foam rubber, and attached to the cushion substrate 16. The cushion substrate 16 could be a simple backer board, as in the depicted embodiment, or a more complex structure, such as a seat frame.

It will be appreciated that a given cushioned surface may have more than one component, and the cable 20 and cover 26 need not be attached to the same substrate component. Additionally, the cover 26 can be made of any suitable material or combination of materials, with some non-limiting examples including leather, vinyl and woven fabrics.

In the depicted embodiment, a cable routing hole 32 is advantageously pre-formed through aligned portions of the cover 26, padding 30 and substrate 16. One or more alignment openings 34 are pre-formed in the cover 26, and preferably not in the padding 30, around the cable routing hole 32. Pre-forming these openings allows for more easily and accurately achieving the same badge position and orientation across multiple cushions.

The badge 14 is advantageously formed as multiple parts, with a badge backer 36 preferably formed of rigid plastic or metal on which a badge fascia 40 is mounted. This allows multiple fasciae having different appearances to be used to with a common backer. The fascia 40 and backer 36 are connected by an adhesive (such as very high bond (VHB) two-sided tape 42) and/or mechanical fasteners. It will be appreciated that a badge back and fascia of any desired shape, size and appearance could be used. Additionally, one or more lights could be incorporated to the badge 14 for a lighted appearance.

The badge backer 36 includes a cable mounting point, such as a hoop 44 and one or more alignment prongs 46 extending from the rear surface thereof. The hoop 44 extends into the cable routing hole 32 where it is connected to the cable 20. The alignment prongs 46 extend through the alignment openings 34 and pierce the padding 30, helping to ensure a desired positioning of the fascia 40 relative to the outer face 24 of the cushion 12.

The cable 20 advantageously includes pre-formed loops at first and second ends 50, 52 thereof. The second end 52 is passed through loop at the first end 50 to secure the first end 50 around the cable mounting hoop 44. The second end 52 loop is attached to the substrate 16 by a fastener 54, such as a lag screw, inserted therethrough. The cable is preferably made from braided wire, although any suitable material could be used. Non-elastic materials are preferred. For lighted badges, an electrical wire could be incorporated with the cable.

For a given cushion application, the cable 20 has a predetermined overall length and the attachment point of the fastener 54 is pre-formed or otherwise pre-designated on the substrate 16. This allows a desired depth of the recessed area 22 to be more easily and accurately achieved for each cushion made.

In use, a desired fascia 40 is attached to the badge backer 36 using the VHB tape 42 (e.g., based on vehicle trim level, upholstery color, vehicle purchaser selection, etc.). The first end 50 of the cable 20 is secured to the cable mounting hoop 44 and the second end 52 is routed through the cable routing hole 32. The badge 14 is initially oriented, with the hoop 44 extending into the routing hole 32 and the alignment prongs 46 extending through the alignment openings 34. The second end 52 of the cable 20 is then secured to the pre-designated location using the fastener 54.

Preferably, the tension achieved with the cable 20 fastened is sufficient to prevent unintended re-orientation of the badge 14. However, a degree of final re-orientation is advantageously achievable by twisting the badge 14 while very firmly pressing on the outer face 24 of the cushion 12.

It will be appreciated that a hard badge assembly according to the present invention allows badges to be positioned, oriented and recessed consistently, accurately, and easily on cushions. Additionally, the badge can be replaced easily without damage to the cushion; for instance, if the wrong badge is applied or if a badge becomes damaged.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described and of the claims appended hereto.

What is claimed is:

1. A method for recessed mounting of a badge to a cushion comprising a substrate having a front side and a back side, padding on the front side of the substrate, and a cover over the padding, the method comprising:
    attaching a first end of a cable having a predetermined overall length to a cable mounting point on a rear surface of a badge;
    passing the cable through a cable routing hole pre-formed in the padding of the cushion; and
    fastening a second end of the cable to a fastener on the back side of the substrate at a predetermined attachment point offset from an axis of the cable routing hole such that a tension of the cable recesses the badge to a desired depth.

2. The method of claim 1, wherein attaching the first end of the cable to the cable mounting point on the rear surface of the badge includes passing the cable through a cable mounting hoop on the rear surface of the badge and passing the second end of the cable through a pre-formed loop at the first end of the cable.

3. The method of claim 1, further comprising passing the cable through the cable routing hole also pre-formed in a cover of the cushion.

4. The method of claim 3, further comprising passing the cable through the cable routing hole also pre-formed in the substrate of the cushion.

5. The method of claim 3, further comprising inserting at least one alignment prong extending from the rear surface of the badge through at least one pre-formed alignment opening in the cover of the cushion.

6. The method of claim 5, further comprising piercing the padding with the at least one alignment prong inserted through the at least one pre-formed alignment opening in the cover of the cushion.

7. The method of claim 1, further comprising assembling the badge by attaching a badge fascia to a badge backer.

8. The method of claim 1, wherein fastening the second end of the cable to the fastener on the back side of the substrate at the predetermined attachment point includes fastening a pre-formed loop at the second end of the cable to the fastener at the predetermined attachment point.

9. The method of claim 1, further comprising, after the first end of the cable is attached to the badge and the second end of the cable is fastened to the substrate:
    pressing on an outer face of the cushion; and
    reorienting the badge while pressing.

10. A method for recessed mounting of a badge to a cushion comprising a substrate having a front side and a back side, padding on the front side of the substrate, and a cover over the padding, the method comprising:
    attaching a first end of a cable to a cable mounting point on a rear surface of a badge;
    passing the cable through a cable routing hole pre-formed in the cover and padding of the cushion;
    inserting at least one alignment prong extending from the rear surface of the badge through at least one alignment opening pre-formed in the cover of the cushion; and
    fastening a second end of the cable to a fastener on the back side of the substrate at a predetermined attachment point offset from an axis of the cable routing hole such that a tension of the cable recesses the badge to a desired depth.

11. The method of claim 10, wherein inserting the at least one alignment prong through the at least one alignment opening further includes inserting at least one additional alignment prong extending from the rear surface of the badge through at least one additional alignment opening pre-formed in the cover of the cushion.

12. The method of claim 10, wherein the cable has a predetermined overall length.

13. The method of claim 10, further comprising piercing the padding with the at least one alignment prong inserted through the at least one pre-formed alignment opening in the cover of the cushion.

14. A cushion assembly comprising:
    a badge having a front surface and a rear surface, a cable mounting point located on the rear surface and at least one alignment prong extending from the rear surface;
    a cushion including a substrate having a front side and a back side, padding connected to the front side of the substrate and having a cable routing hole extending therethrough, and a cover over the padding, the badge being seated in the padding over the cable routing hole, and the at least one alignment prong extending into the padding adjacent the cable routing hole; and
    a cable extending through the cable routing hole and having a first end connected to the cable mounting point and a second end fastened to a fastener on the back side of the substrate at an attachment point offset from an axis of the cable routing hole, a tension of the cable holding the badge at a recessed depth within the padding.

15. The badge assembly of claim 14, wherein the cover has at least one alignment opening, and wherein the at least one alignment prong extends through the at least one alignment opening into the padding.

* * * * *